United States Patent Office 3,505,257
Patented Apr. 7, 1970

3,505,257
GRAFT POLYMERIZATION OF CERTAIN S-ESTERS OF O-CELLULOSIC AND O-AMYLACEOUS THIOCARBONATES WITH ETHYLENICALLY UNSATURATED MONOMERS
John S. Conte, Media, and Robert W. Faessinger, Ridley Park, Pa., assignors to Scott Paper Company, Delaware County, Pa., a corporation of Pennsylvania
Filed Dec. 18, 1967, Ser. No. 691,224
Int. Cl. C08f 25/00
U.S. Cl. 260—17.4         19 Claims

ABSTRACT OF THE DISCLOSURE

A process for preparing graft copolymers of ethylenically unsaturated compounds and cellulosic or amylaceous materials by reacting said ethylenically unsaturated compounds, via peroxidic free-radical initiation, with an S-ester of an O-thiocarbonate derivative of cellulose or starch, said S-ester being formed by reacting said thiocarbonate derivative with an aldehyde or dialdehyde; and the grafted polymers obtained by this process.

BACKGROUND OF THE INVENTION

Field of the invention

This invention relates to graft copolymers of cellulose and starch, and to a process for preparing these graft copolymers. More particularly, this invention relates to a process for preparing graft copolymers of ethylenically unsaturated compounds and cellulose or starch, and to the graft copolymers obtained by this process. The process of this invention provides a method for modifying materials such as wood, wood pulp, paper, cellulosic fibers, starches, and the like, to impart improved physical properties thereto, said improved properties being more permanent in nature than those imparted by way of sizing treatments, resin treatments, and the like.

Description of the prior art

Our copending application, U.S. Ser. No. 599,715, now U.S. Patent 3,357,224 relates to a process for producing graft copolymers of ethylenically unsaturated compounds and mono- or dithiocarbonate derivatives of either cellulosic or amylaceous materials, via peroxidic free-radical initiation; and the substrates disclosed as being the preferred substrates for use in the process disclosed and claimed therein are mono- and dithiocarbonate derivatives of either cellulose or starch which are in the form of a free acid or a salt of said acid, with the salts being particularly preferred. Although esters of these mono- or dithiocarbonates, such as alkyl esters, aralkyl esters, and the like, were found to undergo some degree of graft polymerization with ethylenically unsaturated compounds in the presence of a peroxidic free-radical initiator, these polymerizations were somewhat sluggish reactions, usually requiring temperatures greater than ambient temperatures, and the yields of grafted product were lower than expected.

One of the difficulties that can be encountered in a process wherein the free acid or a salt of a mono- or dithiocarbonate derivative of cellulose or starch is employed as a substrate in a graft polymerization reaction is that the acid or salt may be somewhat sensitive to a strongly acidic pH. It is well-known, for example, that salts of trithiocarbonic acid and salts of O-aliphatic mono- and ditthiocarbonates are susceptible to decomposition in an acidic medium, with the rate of decomposition generally being directly proportional to the acidity of the medium. We have found, however, that the ester derivatives which are employed as substrates in the process of the present invention are less sensitive to a strongly acidic medium in the presence of an aldehyde or dialdehyde than are the mono- and dithiocarbonate derivatives of cellulose or starch in the form of a free acid or a salt, and thus they are more suitable for use in a graft polymerization process which is conducted in a strongly acidic medium than are said acids and salts. Since, in many instances it may be more advantageous to conduct the graft polymerization in a strongly acid medium (for example, when the ethylenically unsaturated compound which is being grafted onto the cellulosic or amylaceous material is itself acidic, e.g. acrylic acid, methacrylic acid, alpha-chloroacrylic acid, itaconic acid, maleic acid, fumaric acid, and the like), the process of the present invention provides a method for grafting an ethylenically unsaturated compound onto a cellulose-containing or starch-containing material wherein the cellulosic or amylaceous intermediate which is employed in the graft polymerization reaction is more stable in a strongly acidic medium than the free acid form or a salt of such an intermediate.

SUMMARY OF THE INVENTION

The present invention resides in a process for preparing graft copolymers of ethylenically unsaturated compounds and a cellulose-containing or a starch-containing material which comprises forming an S-ester of a water-insoluble O-thiocarbonate derivative of cellulose or an S-ester of a water-insoluble O-thiocarbonate derivative of starch by reacting said O-thiocarbonate derivative with an aldehyde or a dialdehyde in an acid medium, and then reacting said S-ester in an acid medium and in the presence of an aldehyde or dialdehyde with at least one ethylenically unsaturated compound via peroxidic free-radical initiation; and in the graft copolymers obtained by way of this process. The process of this invention provides an improved method for grafting ethylenically unsaturated compounds to cellulosic or amylaceous substrates in an acid medium, and the products obtained by this process are highly useful products having improved physical properties which are more permanent in nature than the improvements which can be obtained by a number of the processes available in the prior art.

DESCRIPTION OF THE PREFERRED EMBODIMENTS

As hereinbefore indicated, the substrates which are useful in preparing the graft-copolymers of this invention are S-esters of water-insoluble O-thiocarbonate derivatives of cellulose and S-esters of water-insoluble O-thiocarbonate derivatives of starch, and these esters which are employed in the process of this invention are prepared by reacting a water-insoluble O-thiocarbonate derivative of cellulose or starch with an aldehyde or a dialdehyde in an acid medium.

Illustrative of the types of O-thiocarbonate derivatives which can be employed in preparing the substrates used in the graft-copolymerization process of this invention are the monoand dithiocarbonate derivatives which are the preferred substrates for the graft polymerization process disclosed and claimed in our copending application, U.S. Ser. No. 599,715, filed on Dec. 7, 1966, namely the salts or the free acid forms of said mono- and dithiocarbonates, and it is intended that the disclosure of said copending application be incorporated herein by reference thereto, particularly with regard to that portion of the specification relating to the mono- and dithiocarbonate derivatives of cellulose and starch which are disclosed as being useful as substrates in the grafting process disclosed and claimed, including that portion relating to the methods for preparing said derivatives.

As indicated in U.S. Ser. No. 599,715, it is believed that the preferred mono- and dithiocarbonate derivatives which are employed in the process of that invention have the general formula

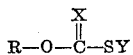

wherein X is either sulfur or oxygen, Y is hydrogen or a cation, and R is the cellulosic or amylaceous residue. More specifically, it is believed that the mono- or dithiocarbonate group is attached at the six-position in the anhydroglucose units of the cellulosic or amylaceous materials, so that these derivatives are believed to comprise units of the structural formula

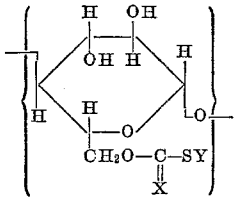

wherein X and Y are as hereinbefore defined.

In a similar manner, it is believed that when these mono- or dithiocarbonate derivatives in either their free acid or salt forms are reach with an aldehyde or a dialdehyde in an acid medium to form the substrate for use in the grafting process of the present invention, the resulting substrate has the following general formula

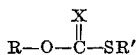

wherein R and X are as hereinbefore defined, and R' is the monovalent radical derived from the aldehyde reactant. Without wishing to be bound to any particular structural formula for substrates employed in the process of this invention (for example, the mono- or dithiocarbonate group need not necessarily be attached at the six-position in the anhydroglucose ring), it is believed that the substrates which are employed in the process of the present invention comprise units having a formula

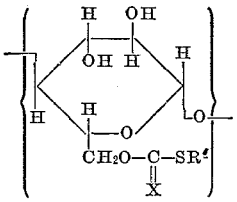

wherein X and R' are as hereinbefore defined. When the substrate is prepared by reacting an aliphatic aldehyde, such as formaldehyde, acetaldehyde, and the like, with the free acid or a salt of a mono- or dithiocarbonate derivative of cellulose or starch, it is believed that the resulting substrate comprises units having the following structural formula

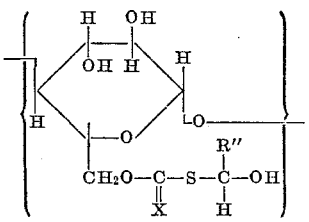

wherein X is as hereinbefore defined and R'' is hydrogen or a monovalent aliphatic hydrocarbon radical. When the substrate is prepared by reacting an aliphatic dialdehyde, such as glyoxal with the free acid or a salt of a mono- or dithiocarbonate derivative of cellulose or starch, it is believed that the resulting substrate comprises units having the following structural formula

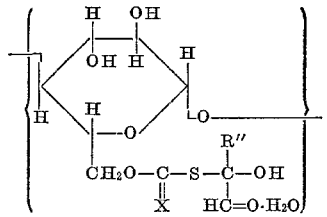

wherein X and R'' are as hereinbefore defined. However, due primarily to the complex nature of these high-molecular weight derivatives of cellulose and starch, it should be understood that the exact structures of these derivatives cannot be determined with any degree of certainty, and we do not intend to be limited to the structural formulae set forth above. As we have hereibefore indicated, the mono-or dithiocarbonate substituent need not necessarily be in the six-position in the anhydroglucose ring; and it is known, for example, that compounds containing mono- and dithiocarbonate groups can undergo rearrangements and disproportionations and yet still react in many instances in a manner similar to that of the unrearranged or undisproportionated materials. The stuctural formulae set forth above are merely an attempt to facilitate and aid in the comprehension of the invention disclosed herein. Those substrates which are reaction products of a mono- or dithiocarbonate derivative of cellulose or starch with low molecular weight aliphatic aldehydes or dialdehydes such as formaldehyde, acetaldehyde and glyoxal are preferred, with the reaction products of formaldehyde being particularly preferred as substrates for use in the practice of the graft polymerization process of the present invention.

As indicated above, the substrates employed in the graft polymerization process of this invention can be prepared by reacting a water-insoluble O-thiocarbonate derivative of cellulose or starch with an aldehyde or dialdehyde in an acidic medium, such as in the presence of a dilute aqueous solution of a mineral acid. A pH in the range of from about 5.0 to about 0.5 is preferred for this reaction, with a pH of from about 4.0 to about 1.0 being particularly preferred. If an aldehyde is employed as a reactant in preparing the substrate to be used in the grafting process of this invention, it should be understood that the aldehyde can be employed in its pure form as a reactant, or it can also be derived from an aldehyde donor material such as paraformaldehyde without departing from the scope of this invention. It should also be understood that mixtures of aldehydes, dialdehydes, or both can also be employed without departing from the scope hereof. It should further be understood that the amount of aldehyde or dialdehyde which is employed depends primarily on factors such as the number of mono- or dithiocarbonate groups present in the water-insoluble O-thiocarbonate employed and the pH of the reaction mixture, although we have found that an aldehyde or dialdehyde concentration in the range of from about 0.15% by weight to about 5.0% by weight, based on the total weight of the reaction mixture is usually sufficient to obtain adequate conversion of the O-thiocarbonate to a substrate, which is useful in the graft polymerization process of this invention, with an aldehyde or dialdehyde concentration of from about 0.5% by weight to about 3.0% by weight being preferred. If, for any reason it is desired to store the substrate for any length of time before employing it in the subsequent graft polymerization reaction, it is highly desirable to maintain acidic conditions somewhat similar to those under which the substrate was prepared. Similarly, if the substrate is to be washed prior to its employment in the graft polymerization reaction, an acidic aldehyde or dialdehyde solution should be employed as the wash solution for said substrate. Since the esterified mono- or dithiocarbonate derivative which is employed in the graft polymerization reaction of this invention is susceptible to hydrolysis, particularly if it is not maintained under ideal conditions for storage (e.g. at the proper pH and in the presence of an aldehyde or dialdehyde) it is preferred that the graft polymerization process be a part of a multiple step process and follow, in relatively short order, the formation of the S-ester substrate. Homopolymer formation can sometimes be significantly reduced by employing both the substrate formation step and the graft polymerization step as part of an uninterrupted sequence.

As in the case with graft polymerization process disclosed and claimed in our copending application, U.S. Serial No. 599,715, the graft polymerization process of the present invention utilizes a peroxidic initiator as part of the redox system. By redox system is meant the well-known systems of the type described in D'Alelio, Gaetano F., Fundamental Principles of Polymerization, John Wiley and Sons, New York, 1952. Such peroxidic initiators include hydrogen peroxide, persulfates such as ammonium, sodium or potassium persulfate, hydroperoxides such as t-butyl hydroperoxide, diisopropylbenzene hydroperoxide, cumene hydroperoxide, 1-phenylethylhydroperoxide, and the like, diacylperoxides such as benzoyl peroxide, acetyl peroxide and the like, di-alkyl peroxides such as di-t-butyl peroxide, dicumyl peroxide, and the like; peresters such as t-butyl peroxyacetate, t-butyl peroxybenzoate and the like; peracids such as performic acid, peracetic acid, perbenzoic acid, peroxylactic acid and the like; and others such as dialkyl peroxydicarbonates. These peroxy compounds must be capable of initiating a free-radical polymerization by themselves or in the presence of an activator, such as a reducing agent. The preferred group of peroxidic free-radical initiators are those that are water-soluble when the copolymerization is conducted in an aqueous medium. As would be expected, the peroxidic initiator should be uniformly distributed through the reaction mixture.

The monomers which can be employed in the graft-polymerization reaction of the present invention are the same as those employed in the graft-polymerization process to which our copending application, U.S. Ser. No. 599,715 relates, namely those ethylenically unsaturated compounds which readily homopolymerize or readily copolymerize with other ethylenically unsaturated compounds either in bulk, or in an aqueous solution, or as an emulsion, when exposed to a redox system capable of initiating a polymerization or copolymerization. By the term monomer is meant an ethylenically unsaturated compound having the structure $$>C=C<$$

which encompasses vinylene monomers of the general form $R^{IV}HC=CHR^{IV}$ and vinylidene monomers of the general form $H_2C=CR_2^{IV}$ and including the monomers on which all four of the open valence bonds are occupied by $R^{IV}$ substituents as well as those in which at least two $R^{IV}$ substituents, one on each carbon atom, form a ring derivative.

The radical $R^{IV}$ is selected from at least one member of the electron-accepting groups and electron-donating groups consisting of:

(1) Hydrogen;

(2) Alkyl groups, alkenyl groups and alkynyl groups, both substituted and unsubstituted, in which the hydrocarbon moiety contains up to about six carbon atoms such as methyl, ethyl, butyl, amyl, hexyl, ethenyl, hydroxymethyl, chloromethyl, and the like;

(3) Aryl groups, including substituted aryl groups such as phenyl, alpha-chlorotolyl, tolyl, 4-chlorophenyl, alpha-tolyl, xylyl, 2-bromo-4-ethylphenyl, and the like;

(4) Electronegative groups, for example, chloro, bromo, cyano, and the like;

(5) Alicyclic groups and heterocyclic groups, both substituted and unsubstituted, such as pyridyl, thienyl, furyl, pyrrolidyl, and the like;

(6) Groups of the general formula

wherein $R^V$ is selected from the group consisting of hydrogen, $R^{IV}$ substituted hydrocarbons containing from 1 to 18 carbon atoms, and unsubstituted hydrocarbons containing from 1 to 18 carbon atoms, such as methyl, ethyl, butyl, amyl, hexyl, heptyl, octadecyl, nitroethyl, nitrobutyl, N,N-dimethylaminoethyl, t-butylaminoethyl, 2-cyanoethyl, cyclohexyl, N,N-diethylaminoethyl, hydroxyethyl, hydroxypropyl, and the like;

(7) Groups of the general formula

(8) Groups of the general formula

(9) Groups of the general formula $R^{VI}$—O—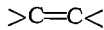;

(10) Groups of the general formula

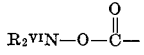

and wherein $R^{VI}$ is selected from at least one member of the group consisting of hydrogen, $R^{IV}$ and $R^V$, aliphatic hydrocarbon groups of from 1 to 18 carbon atoms and in addition the substituted as well as the unsubstituted hydrocarbon groups containing from 1 to 18 carbon atoms such as the methyl, ethyl, propyl, butyl, amyl, hexyl, heptyl, octadecyl, chloroethyl, chloromethyl, hydroxyethyl, hydropropyl epoxyethyl, phenyl, p-chlorophenyl, and the like.

At least one of the members of the following group of ethylenically unsaturated monomers which readily homopolymerize or readily copolymerize with other ethylenically unsaturated compounds either in bulk, or in an aqueous solution, or as an emulsion may be used: ethylenically unsaturated aromatic compounds and mono- di-, tri, tetra- and penta-substituted aromatic compounds, wherein the ring is substituted with at least one member selected from the class consisting of alkyl groups (substituted and unsubstituted) having from 1 to 7 carbon atoms and/or with inorganic electron-accepting and/or inorganic donating groups such as halogen, nitro, sulfano, etc., and wherein the ethylenically unsaturated moiety has from 2 to 5 carbon atoms, either substituted or unsubstituted, such as alpha-methylstyrene, p-chloromethylstyrene, o-methylstyrene, m-methylstyrene, 2,4-dimethylstyrene, 2,5-dimethylstyrene, 2,4,5-trimethylstyrene, p-ethylstyrene, o-bromostyrene, 2-bromo-4-ethylstyrene, p-isopropylstyrene, p-chlorostyrene, 2,4-dichlorostyrene, p-bromostyrene, o-chlorostyrene, m-chlorostyrene, beta-chlorostyrene, 2,5-dichlorostyrene, 4-ethoxystyrene, p-isopropylalpha-methylstyrene, beta-nitrostyrene, p-nitrostyrene, and the like; also polymerizable alkylacrylic acids having from 1 to 5 carbon atoms in the alkyl chain provided, in all instances, when there is no alkyl chain, the substituent is hydrogen or some other specified moiety, such as halogens, cyano, etc., e.g., acrylic acid, methacrylic acid, alphachloroacrylic acid, 2-furfurylacrylic acid, and the like; alkylacrylic acid esters having from 1 to 5 carbon atoms in the alkyl chain provided, in all instances, when there is no alkyl chain, the substituent is hydrogen or some other specified moiety, such as halogen, cyano, etc., and wherein the esters are formed from monohydric alcohols (substituted and unsubstituted) selected from the group consisting of alkyl alcohols having from 1 to 20 carbon atoms such as amyl acrylate, amyl methacrylate, benzyl methacrylate, benzyl acrylate, glycidyl methacrylate, butyl acrylate, butyl methacrylate, dodecyl acrylate, cyclohexyl acrylate, cyclopentyl methacrylate, ethyl acrylate, methyl-alpha-bromoacrylate, methyl-alpha-chloroacrylate, ethyl methacrylate, 2-ethylhexyl acrylate, heptyl acrylate, ethyl-alpha-bromoacrylate, hexyl methacrylate, lauryl methylacrylate, methyl acrylate, methyl methacrylate, stearyl acrylate, stearyl methacrylate, propyl acrylate, 2-bromoethyl acrylate, 2-chloroethoxyethyl methacrylate, etc.; the substituted amino alcohols having from 2 to 7 carbon atoms in the alkyl chain and from 1 to 7 carbon atoms in the alkyl chains on the amino moiety such as N,N-dimethylaminoethyl acrylate, N-t-butylaminoethyl methacrylate, N,N-diethylaminoethyl acrylate, 2-N-morpholinoethyl methacrylate, and the like; nitro alcohols wherein the alkyl chain has from 2 to 7 carbon atoms such as 3-nitro-2-butanol, 2-nitro-3-hexanol, 2-methyl-2-nitro-1-butanol, 2-nitro-2-methyl propanol, etc.; cyanoalkyl alcohols wherein the alkyl chain has from 2 to 7 carbon atoms such as 2-cyanoethyl acrylate, and the like; unsaturated polymerizable alkylacrylic acid amides having from 1 to 5 carbon atoms in the alkyl chain provided, in all instances, when there is no alkyl chain, the substituent is hydrogen or some other specified moiety described above, and also wherein the amide is formed from ammonia, primary and secondary amine or a diamine having from 1 to 16 carbon atoms (substituted and unsubstituted) such as acrylamide, methacrylamide, ethacrylamide, methylene-bis-acrylamide, t-butylacrylamide, 2-cyanoacrylamide, N-(p-chlorophenyl) methacrylamide, N,N-diallylacrylamide, N,N-dimethylacrylamide, hexamethylene-bis-acrylamide, N-alphanaphthylacrylamide, etc.; or the ethylenically unsaturated nitriles such as acrylonitrile, methacrylonitrile, ethacrylonitrile, alpha-chloroacrylonitrile and the like; polymerizable alkylene glycol and polyhydric glycol alkylacrylates and dialkylacrylates having 1 to 5 carbon atoms in the alkyl chain provided, in all instances, when there is no alkyl chain, the substituent is hydrogen or some other specified moiety described above, such as ethylene glycol dimethacrylate, triethylene glycol dimethacrylate, polyethylene glycol dimethacrylate, tetramethylene dimethacrylate, glyceryl triacrylate, hydroxyethyl methacrylate, hydroxypropyl methacrylate and the like; fatty acid esters of 1-olefins (substituted and unsubstituted) containing from 2 to 24 carbon atoms but preferably from 2 to 18 atoms wherein the 1-olefin alcohol precursor of the fatty acid esters has from 2 to 8 carbon atoms but preferably 2 to 3 carbon atoms, such as, vinyl acetate, vinyl propionate, vinyl butyrate, isopropenylacetate, vinyl-n-hexanoate, vinylchloroacetate, vinylcrotonate, vinyl-n-decanoate, vinyl-formate, vinyl-2-ethyl hexoate, vinyl laurate, vinyl oleate, vinyl stearate, vinyl trifluoroacetate, allyl linolate, allyl oleate, allyl acetate, allyl propionate, allyl chloroacetate, allyl caproate, allyl butyrate, etc.; aromatic acid esters (substituted and unsubstituted) of unsaturated alcohols wherein the alcohol precursor has from 2 to 8 carbon atoms but preferably from 2 to 3 carbon atoms such as allyl benzoate, diallyl phthalate, vinyl phthalate, vinyl benzoate, etc.; ethylenically unsaturated aliphatic diacids containing from 4 to 10 carbon atoms but preferably from 4 to 6 carbon atoms, and their esters, nitriles and amides such as, itaconic acid, maleic acid, fumaric acid, dimethyl maleate, dibutyl maleic, dimethyl fumarate, dibutyl fumarate, maleic anhydride, diethyl fumarate, etc.; polymerizable aliphatic dienes such as butadiene, 2,3-dimethyl butadiene, isopropene, pentadiene, etc., and the haloprenes such as chloroprene and the like; 1-olefins (substituted and unsubstituted) containing from 2 to 18 carbon atoms but preferably from 2 to 8 carbon atoms such as vinyl chloride, vinylidene chloride, allylamine, diallylamine, diallylphosphate, allyl chloride, nitroethylene, butadiene monoxide, vinyl acrylate and the like; the vinyl esters (substituted and unsubstituted) such as vinylethyl ether, vinylpropyl ether, vinylisobutyl ether, vinyl-2-methoxyethyl ether, vinyl-n-butyl ether, vinyl 2-chloroethyl ether, vinyl-2-ethylhexyl ether, and the like; or other vinyl compounds such as divinylsulfone, divinylsulfide, divinylbenzene, etc.; ethylenically unsaturated heterocyclic compounds wherein the heterocycle contains from 3 to 5 carbon atoms and the hetero atoms are selected from the group consisting of N, O and S such as the vinyl pyridines, N-vinyl pyrrolidone, vinyl furan, alpha vinyl thiophene and the like. In general, the only requirement necessary in order for a monomer to be useful in this invention is that it has at least one olefinic double bond which readily homopolymerizes or readily copolymerizes with other ethylenically unsaturated compounds either in bulk, or in an aqueous solution, or as an emulsion.

More specifically, at least one member of the following group of polymerizable or copolymerizable monomers is useful; styrene, p-chloromethyl styrene, sodium p-styrenesulfonate, vinyl toluene, 2,5-dichlorostyrene, alpha-methyl styrene, acrylamide, acrylic acid, acrylonitrile, N-t-butyl acrylamide, methacrylamide, N,N-methylene-bis-acrylamide, N,N-diethylacrylamide, methacrylic acid, t-butylaminoethyl methacrylate, N,N-diethylaminoethyl acrylate, N,N-diethylaminoethyl methacrylate, N,N-dimethylaminoethyl acrylate, 2-cyanoethyl acrylate, n-butyl acrylate, n-butyl methacrylate, decyl acrylate, decyl methacrylate, ethyl acrylate, 2-ethylhexyl acrylate, ethyl methacrylate, glycidyl acrylate, glycidyl methacrylate, n-hexyl methacrylate, n-lauryl methacrylate, methyl acrylate, methyl methacrylate, decyl-octyl methacrylate, stearyl methacrylate, ethylene glycol dimethacrylate, triethylene glycol dimethacrylate, tetraethylene glycol dimethacrylate, polyethylene glycol dimethacrylate, hydroxypropyl methacrylate, hydroxyethyl methacrylate, diallyl adipate, diallyl maleate, N,N-diallyl melamine, diallyl phthalate, diallyl phosphite, diallyl phosphate, diallyl fumarate, vinyl chloride, vinylidene chloride, maleic acid, itaconic acid, fumaric acid, di-n-butyl fumarate, di-n-butyl maleate, di-n-butyl itaconate, diethyl maleate, methyl vinyl ketone, 2-methyl-5-vinylpyridine, N-vinyl carbazole, 2-vinyl pyridine, 1-vinyl-2-pyrrolidone, N-vinyl pyrrolidene, vinyl-n-butyl ether, vinyl-isobutyl ether, vinyl-2-chloroethyl ether, vinyl ethyl ether, vinyl-2-ethylhexyl ether, vinyl triethoxysilane, vinyl stearate, vinyl butyrate, vinyl acetate, vinyl-2-ethylhexoate, vinyl propionate, divinyl benzene and divinyl sulfone.

As hereinbefore indicated, the copolymerization reaction is accomplished by reacting, in an acid medium, the S-ester of an O-thiocarbonate derivatve of cellulose or starch which is employed as the substrate in this reaction with an ethylenically unsaturated monomer or monomers of the type set forth above in the presence of an aldehyde or dialdehyde and a peroxidic free radical initiator. A mineral acid, such as hydrochloric acid, sulfuric acid, phosphoric acid, and the like, can be employed to obtain the acidic conditions necessary for efficiently conducting this graft polymerization reaction; and, as in the case of forming a S-ester of the O-thiocarbonate derivative, a pH in the range of from about 5.0 to about 0.5 is preferred for the copolymerization reaction, with a pH of from 4.0 to about 1.0 being particularly preferred. Also as in the case of forming the S-ester of the O-thiocarbonate derivatives, the amount of aldehyde or dialdehyde which is employed in the graft polymerization reaction depends on a number of factors, such as the amount of S-ester which is employed as a substrate in the graft polymerization reaction, the degree of "thioation" of the substrate which is employed (i.e. the number of esterified mono- or dithiocarbonate groups which are present in the substrate which is employed), and the pH of the reaction mixture. In any event, the concentration of aldehyde or dialdehyde and the pH of the reaction mixture should be such that the reactive S-ester which is employed as a substrate is hydrolytically stable under the conditions and the concentrations employed. Within the pH ranges set forth above, we have found that an aldehyde or dialdehyde concentration ranging from about 0.15% by weight to about 5.0% by weight, based on the total weight of polymerization reaction mixture is usually sufficient to maintain the stability of the reactive substrate in the reaction mixture, with an aldehyde or dialdehyde concentration in the range of from about 0.5% by weight to about 3.0% by weight being preferred. Again, as in the case of forming the S-ester substrate, mixtures of aldehydes, dialdehydes, or both can be employed in the polymerization reaction mixture; and aldehyde donor materials such as paraformaldehyde can be employed as a source of the aldehyde materials without departing from the scope of this invention. Low-molecular weight aliphatic aldehydes or dialdehydes such as formaldehyde, acetaldehyde, and glyoxal are preferred for use in the graft polymerization reaction also, with formaldehyde being particularly preferred.

The copolymerization reaction can be conducted in either an aqueous or nonaqueous system, but is preferably and ordinarily conducted in an aqueous system in which the monomer is uniformly distributed. When the reaction medium is aqueous, a solution, suspension, or an emulsion of the ethylenically unsaturated monomer can be used to achieve uniform distribution of the monomer. The presence of a wetting agent in the reaction medium is advantageous since it facilitates monomer penetration into the S-ester substrate. Emulsifiers can be used to achieve a uniform emulsion of an insoluble monomer and/or peroxidic initiator. Since substrates derived from amylaceous materials may be more readily soluble in aqueous solutions than substrates derived from cellulosic materials, precautions must often be taken to prevent the solubilization of such substrates during both the formation of the substrate and the subsequent graft polymerization of the substrate when these reactions are conducted in an aqueous medium. In many instances this can best be done by using O-thiocarbonate derivatives of unpasted or non-solubilized starches to prepare the S-ester substrates which are employed in the process of the present invention, and by forming the S-ester substrates and grafting said substrates at or near ambient or room temperatures.

The S-ester of an O-thiocarbonate derivative of cellulose or starch which is employed as a substrate in the graft polymerization reaction can be used in virtually any proportion to the monomer, e.g., from about 0.5 percent to 99.9 percent by weight based on the ethylenically unsaturated monomer. The monomer can also be used in almost any concentration in the reaction solution, e.g., from about 1 percent to about 90 percent of the total reaction solution. After adding a water soluble peroxidic free-radical initiator to the acidic solution containing the substrate, monomer, and aldehyde or dialdehyde, the reaction will proceed at virtually any temperature, e.g., from about 0° to about 100° C. Reaction times can vary from 3 minutes to about 96 hours or longer and reaction pressure can be atmospheric, subatmospheric or superatmospheric, depending upon the monomer and the type of product desired. An acidic mixture of substrate, and aldehyde or dialdehyde can also be added to a mixture of the monomer and peroxidic initiator in the selected reaction medium. The usual graft polymerization techniques employing a peroxidic initiated system can be used. However, because of the ease of graft polymerization, less rigorous conditions are ordinarily required. For example, temperatures of from about 25° C. to about 75° C. are usually sufficient to achieve any degree of monomer add-on desired, e.g., from 5 percent to 500 percent.

As is well known in the art, the properties of the graft polymer produced depends upon the substrate used, the monomer or mixture of monomers used, the percent of add-on of monomer achieved, and the reaction conditions employed.

The graft polymer can, if desired, be purified using conventional techniques, e.g., to remove sulfur-containing by-products, unreacted monomer, homopolymer, unreacted aldehyde or dialdehyde, etc.; and it can also be, if desired, neutralized of any residual acid by treatment with dilute solutions of base with subsequent water washings.

The utilities of the products obtained from the practice of this invention should be evident. Graft copolymers of cellulosic materials obtained by the process of this invention exhibit exceptional dimensional stability, improved electrical properties, and resistance to bacterial degradation. Some of the cellulose copolymers obtained by the process of the present invention have specialized uses, such as fibrous or filamentous ion exchange materials. When such copolymers are formed from monomers having acid moieties, such as acrylic acid, the copolymers are cation active. When such copolymers are formed from monomers having amine moieties, such as methacrylic acid esters derived from amino alcohols as listed above, the copolymers are anion active. The fibrous nature of the ion exchange active products makes them particularly attractive in such applications as in catamenial devices, both external and internal, and in metal ion scavengers, to name a few. The fibrous properties of some of these copolymers also are especially attractive in paper and non-woven fabric manufacture. The fabric and sheet materials made from copolymers of cellulosic materials are valuable as such. A judicious choice of monomer or monomers allows for a variation of properties, such as water repellancy in case of a copolymer made from stearylmethacrylate, or water absorbency if the copolymer is made from acrylic acid. In addition, copolymers derived from acrylic acid are highly hemostatic.

Select copolymers of cellulosic materials prepared by the processes disclosed herein such forms as cloth, cord, yarns, fibers, etc., find use as superb reinforcing materials when mixed with or used in conjunction with such hydrophobic natural and synthetic polymers as rubber, polystyrene, polyethylene, polyvinylchloride, etc., since these copolymers have vastly improved compatability with the admixed or coating material. By this means, the utility of such items as tires, reinforced rubber sheets, reinforced synthetic plastic sheets or other formed articles is improved.

Generally, all types of materials containing from 5 to 100% cellulose fibers can be used to prepare the O-thiocarbonate derivatives which are employed as the starting materials in the process of the present invention. For example, the process is applicable to derivatives of cellulose in the form of cotton, rayon, linen, jute, etc., fibers, sheets, yarns, fabrics, or ropes wherein the content of the cellulose containing material is of from 5 to 100%. The process is also applicable for treating wood derivatives in any physical form such as boards, poles and lumber. Adhesives with improved bonding capacities result from amylaceous copolymers of acrylonitrile, lower alkylacrylates, acrylic acid or mixtures of these monomers. Also, amylaceous copolymers of acrylic or methacrylic acid yield useful ion-exchange powders, hydrophilic dusting powders and paper and textile coatings. Amylaceous copolymers of methylolated acrylamide make excellent sizing agents, non-woven fabric binders and paper wet-strengthening resins. Still further, styrene or alkyl acrylate ester copolymers of amylaceous materials find use as hydrophobic dusting powders and molding powders. These uses are merely a few examples of some of the specific ends to which such copolymers may be applied. To one familiar with the properties and uses of polymers and copolymers, innumerable combinations of monomers yielding starch copolymers suggest themselves.

In order to describe the present invention so that it may be more clearly understood, the following examples are set forth in which all parts and percentages are expressed in parts by weight unless otherwise stated. These examples are set forth primarily for the purpose of illustration, and any specific enumeration of detail contained therein should not be interpreted as a limitation on the concept of this invention.

EXAMPLE 1

Ten parts of a knitted rayon fabric in the form of a sock were converted to the sodium salt of a cellulose-O-dithiocarbonate derivative of rayon by being exposed for about 15 minutes to an emulsion consisting of six parts of carbon disulfide, 2.5 parts sodium hydroxide, 0.1 part of an emulsifier ("Triton X–155," an alkylaryl polyether emulsifier of Rohm & Haas Company), and 250 parts of water. The resultant sodium salt of the cellulose-O-dithiocarbonate derivative was washed thoroughly with water to remove all soluble by-products, and was then steeped for 30 minutes in 300 parts of 0.3% aqueous sulfuric acid solution containing 1% formaldehyde and having a pH of 1.6. After this 30 minute steeping period, the entire mixture was added to a polymerization emulsion composed of 5 parts of methylmethacrylate, 3.0 parts of a 30% hydrogen peroxide solution, 185 parts deionized water, and a sufficient quantity of an emulsifier to form a stable emulsion (from 0.25 part to 1.0 part of a polyoxyethylene sorbitan trioleate emulsifier which is sold under the tradename "Tween–85" (Atlas Chemical Corporation). The resulting reaction mixture was heated to a temperature of 60° C. and maintained at this temperature for a two hour period. The graft copolymer obtained from this reaction was then washed thoroughly with water and dried in an oven at 110° C. for two hours. An analysis of the resulting product indicated that 45% of the methylmethacrylate monomer had been converted to a polymer, and a prolonged extraction with acetone indicated that 97% of the polymer which was converted was in the form of a grafted polymer (i.e. was in the form of a copolymer with the rayon substrate).

EXAMPLES 2–5

Four separate 10 part specimens of knitted rayon sock were dithiocarbonated in a manner similar to that set forth in Example 1, and each of these dithiocarbonated specimens was then steeped for 30 minutes in separate solutions containing 300 parts of 0.3% aqueous sulfuric acid solution and 1% formaldehyde to form S-methylol esters of the cellulose-O-dithiocarbonate derivatives. The pH of these treating solutions was 1.6. After the 30 minute steeping period, each of the resulting mixtures was added to a separate polymerization emulsion similar to that set forth above in Example 1, except that instead of the methylmethacrylate monomer which was employed in the polymerization emulsion of Example 1, the various polymerization emulsions employed in this example contained 5 parts of ethylacrylate, 5 parts of a mixture of 50% by weight of methylmethacrylate and 50% by weight of styrene, 5 parts of a mixture of 50% by weight of methylmethacrylate and 50% by weight of acrylonitrile, and 5 parts of a mixture of 50% by weight of acrylonitrile and 50% by weight of styrene respectively. As in the case of Example 1, the graft polymerization reactions were each conducted for two hours at a temperature of 60° C., and the resulting graft copolymers were subsequently washed thoroughly with water and dried in an oven at 110° C. for a two hour period. The results obtained from these graft polymerization reactions were as follows:

| Ex. No. | Monomer System | Percent Conversion of Monomer to Polymer | Polymer in Grafted Form |
|---|---|---|---|
| 2 | Ethylacrylate | 48 | 98 |
| 3 | 50% Methylmethacrylate, 50% styrene | 56 | 99 |
| 4 | 50% Methylmethacrylate, 50% acrylonitrile | 15 | 93 |
| 5 | 50% Acrylonitrile, 50% styrene | 19 | 93 |

[1] In these examples, as well as in the subsequent examples, the percent of polymer in grafted form is determined by performing an extraction on a sample of the grafted product, using a solvent in which a homopolymer or an ungrafted copolymer of the monomer system would be soluble, for example, solvents such as dimethylsulfoxide, dimethylformamide, toluene, acetone, chlorinated hydrocarbon solvents, and the like.

EXAMPLES 6–17

Twelve separate 10 part specimens of knitted rayon sock were dithiocarbonated and esterified in a manner similar to that set forth in Example 1. After the samples had been esterified to form the S-methylol esters of the cellulose-O-dithiocarbonate derivatives of rayon, each of the esterified samples was washed thoroughly in a Büchner funnel with sufficient aqueous 1% formaldehyde solution which was adjusted to a pH of 3.5 with sulfuric acid to remove any soluble-by-products which may have been present in said samples; and then each of these samples was suspended for 4 hours and at 60° C. in a separate polymerization emulsion which contained 540 parts of a 1% formaldehyde solution which has been adjusted to a pH of 3.5 with sulfuric acid, 3.0 parts of 30% hydrogen peroxide, 0.25 to 1.0 part of an emulsifier ("Tween–85"), and 5.0 parts of a monomer or mixture of monomers. The resulting graft copolymers were then washed and dried in a manner similar to that set forth in the previous examples. The various monomer systems which were employed and the results obtained from these graft polymerization reactions were as follows:

| Ex. No. | Monomer System | Percent Conversion of Monomer to Polymer | Polymer in Grafted Form |
|---|---|---|---|
| 6 | Ethylacrylate | 94 | 99 |
| 7 | Butylacrylate | 93 | 97 |
| 8 | Methylmethacrylate | 93 | 100 |
| 9 | Hydrooxyethylmethacrylate | 89 | 100 |
| 10 | Acrylonitrile | 8 | 100 |
| 11 | Methacrylonitrile | 37 | 100 |
| 12 | Acrylamide | 17 | 100 |
| 13 | Acrylic Acid | 25 | 100 |
| 14 | 50% Methylmethacrylate, 50% styrene | 90 | 98 |
| 15 | 50% Methylmethacrylate, 50% acrylonitrile | 46 | 97 |
| 16 | 50% Ethylacrylate, 50% styrene | 75 | 99 |
| 17 | 50% Styrene, 50% acrylonitrile | 44 | 95 |

EXAMPLES 18–29

Twelve separate 10 part specimens of knitted cotton sock were dithiocarbonated, esterified, washed, polymerized, washed and dried in a manner similar to that set forth in Examples 6 to 17. The monomer systems which were employed in these various graft polymerization reactions and the results which were obtained in these various graft polymerization reactions were as follows:

| Ex. No. | Monomer System | Percent Conversion of Monomer to Polymer | Polymer in Grafted Form |
|---|---|---|---|
| 18 | Ethylacrylate | 86 | 63 |
| 19 | Butyl acrylate | 66 | 70 |
| 20 | Acrylonitrile | 14 | 74 |
| 21 | Methacrylonitrile | 17 | 79 |
| 22 | Acrylamide | 9 | 100 |
| 23 | Acrylic Acid | 9 | 100 |
| 24 | Methylmethacrylate | 96 | 86 |
| 25 | Hydroxyethylmethacrylate | 80 | 99 |
| 26 | 50% Methylmethacrylate, 50% styrene | 94 | 75 |
| 27 | 50% Ethylacrylate, 50% styrene | 82 | 48 |
| 28 | 50% Methylmethacrylate, 50% acrylonitrile | 48 | 75 |
| 29 | 50% Styrene, 50% acrylonitrile | 48 | 61 |

EXAMPLES 30–37

Eight separate 10 part samples of knitted rayon sock were dithiocarbonated and esterified in a manner similar to that set forth in Example 1, were removed from the esterification reaction mixtures, and were then wrung by hand. Each sample was then suspended for four hours and at a temperature of from 60° C. to 61° C. in separate polymerization emulsions similar to those employed in Examples 6 to 17. Upon completion of the polymerization reaction, the resulting graft copolymers were washed and dried in a manner similar to that set forth in the previous examples. The monomer systems which were employed in these various graft polymerization reactions and the results which were obtained in these various graft polymerization reactions were as follows:

| Ex. No. | Monomer System | Percent Conversion of Monomer to Polymer | Percent Polymer in Grafted Form |
|---|---|---|---|
| 30 | Ethylacrylate | 88 | 94 |
| 31 | Butyl acrylate | 77 | 95 |
| 32 | Methylmethacrylate | 89 | 99 |
| 33 | Hydroxyethylacrylate | 79 | 100 |
| 34 | Acrylonitrile | 75 | 95 |
| 35 | Acrylamide | 16 | 100 |
| 36 | Acrylic acid | 19 | 100 |
| 37 | 80% Styrene, 20% acrylonitrile | 50 | 93 |

EXAMPLES 38-43

Six separate 10 part samples of knitted cotton stock were dithiocarbonated, esterified, polymerized, washed, and dried in a manner similar to that set forth in Examples 30 to 37. The monomer systems which were employed and the results which were obtained in these various graft polymerization reactions were as follows:

| Ex. No. | Monomer System | Percent Conversion of Monomer to Polymer | Percent Polymer in Grafted Form |
|---|---|---|---|
| 38 | Ethylacrylate | 78 | 86 |
| 39 | Butyl acrylate | 95 | 54 |
| 40 | Methylmethacrylate | 85 | 90 |
| 41 | Hydroxyethylmethacrylate | 80 | 100 |
| 42 | Acrylonitrile | 10 | 100 |
| 43 | 89% Styrene, 20% acrylonitrile | 78 | 59 |

EXAMPLES 44-53

Ten separate 10 part samples of knitted rayon sock were dithiocarbonated and esterified in a manner similar to that set forth in Example 1. After the samples had been esterified to form the S-methylol esters of the cellulose-o-dithiocarbonate derivatives of rayon, each of the esterified samples was subjected to two separate washings with 300 parts of a 1% aqueous formaldehyde solution containing 0.3% sulfuric acid. The samples were then wrung by hand and suspended for 4 hours at 60° C. in separate polymerization emulsions similar to those employed in Examples 6 to 17. Upon completion of the polymerization reactions, the samples were thoroughly washed and then dried in a manner similar to that set forth in the previous examples. The monomer systems which were employed and the results which were obtained in these various graft polymerization reactions were as follows:

| Ex. No. | Monomer System | Percent Conversion of Monomer to Polymer | Percent Polymer in Grafted Form |
|---|---|---|---|
| 44 | Styrene | 61 | 95 |
| 45 | Vinyl styrene | 28 | 92 |
| 46 | p-(t-butyl) Styrene | 18 | 100 |
| 47 | p-Chlorostyrene | 32 | 93 |
| 48 | Tetrafluoropropylacrylate | 92 | 97 |
| 49 | 50% Styrene, 50% ethylacrylate | 80 | 97 |
| 50 | 50% Vinyl toluene, 50% ethylacrylate | 64 | 90 |
| 51 | 50% p-(t-butyl) Styrene, 50% ethylacrylate | 36 | 93 |
| 52 | 50% Tetrafluoropropylacrylate, 50% ethylacrylate | 92 | 100 |
| 53 | 50% Dimethylaminoethylmethacrylate, 50% ethylacrylate | 30 | 100 |

EXAMPLES 54-63

Ten separate 10 part samples of bleached kraft southern pine wood pulp were dithiocarbonated, esterified, washed, polymerized, washed, and dried in a manner similar to that set forth in Examples 6 to 17, except that the amount of monomer which was employed in the various polymerization emulsions was doubled in each instance (i.e. instead of 5 parts of monomer or a mixture of monomers, 10 parts of monomer or a mixture of monomers were employed in each of the various polymerization emulsions which were used). The monomer systems which were employed and the results which were obtained in these various graft polymerization reactions were as follows:

| Ex. No. | Monomer System | Percent Conversion of Monomer to Polymer | Percent Polymer in Grafted Form |
|---|---|---|---|
| 54 | Ethylacrylate | 95 | 45 |
| 55 | Butyl acrylate | 89 | 36 |
| 56 | Methylmethacrylate | 99 | 70 |
| 57 | Hydroxyethylmethacrylate | 76 | 100 |
| 58 | Acrylonitrile | 42 | 39 |
| 59 | Methacrylonitrile | 17 | 27 |
| 60 | Styrene | 87 | 92 |
| 61 | 50% Styrene, 50% ethylacrylate | 87 | 45 |
| 62 | 50% Styrene, 50% methylmethacrylate | 93 | 66 |
| 63 | 50% Acrylonitrile, 50% methylmethacrylate | 61 | 43 |

EXAMPLES 64-66

Three separate 10 part specimens of knitted rayon sock were dithiocarbonated in a manner similar to that set forth in Example 1, then esterified by steeping each of resulting dithiocarbonate derivatives for 30 minutes in 300 parts of a 1% aqueous acetaldehyde solution containing 0.3% sulfuric acid. The resulting esterification reaction mixtures had pH's of approximately 2.0. The esterified dithiocarbonate derivatives obtained from this esterification reaction were wrung by hand and then suspended for four hours at 60° C. in a polymerization emulsion which contained 5 parts of a monomer or mixture of monomers. 0.5 part of a polyoxyethylene sorbitan trioleate emulsifier (an emulsifier sold by Atlas Chemical Corporation under the tradename "Tween-85"), 3 parts of a 30% solution of hydrogen peroxide, and 550 parts of a 1% aqueous acetaldehyde solution which has been adjusted to a pH of 3.1 with sulfuric acid. Upon completion of the graft polymerization reaction, the resulting graft copolymers were washed and dried in a manner similar to that set forth in the previous examples. The monomer systems which were employed and the results which were obtained in these various graft polymerization reactions were as follows:

| Ex. No. | Monomer System | Percent Conversion of Monomer to Polymer | Percent Polymer in Grafted Form |
|---|---|---|---|
| 64 | 80% Styrene, 20% acrylonitrile | 58 | 97 |
| 65 | 50% Styrene, 50% methylmethacrylate | 56 | 98 |
| 66 | 50% Styrene, 50% ethylacrylate | 47 | 98 |

EXAMPLES 67-70

Four separate 10 part specimens of knitted rayon sock were dithiocarbonated, esterified, polymerized, washed, and dried in a manner similar to that set forth in Examples 64-66, except that glyoxal was used instead of acetaldehyde in both the esterification reaction mixture and the polymerization reaction mixture. The monomer systems which were employed and the results which were obtained in the various graft polymerization reactions were as follows:

| Ex. No. | Monomer System | Percent Conversion of Monomer to Polymer | Percent Polymer in Grafted Form |
|---|---|---|---|
| 67 | Methylmethacrylate | 52 | 99 |
| 68 | 80% Styrene, 20% acrylonitrile | (¹) | 31 |
| 69 | 50% Styrene, 50% methylmethacrylate | (¹) | 49 |
| 70 | 50% Styrene, 50% ethylacrylate | (¹) | 31 |

¹ Since a precipitate formed in these reaction mixtures, an attempt was not made to determine the percent conversion of monomer to polymer.

EXAMPLES 71-76

Three separate 10 part samples of knitted rayon sock and three separate 10 part samples of knitted cotton sock were soaked for five minutes in enough aqueous solution of 1% sodium hydroxide to sufficiently cover the samples completely. After this five minute soaking, the samples were filtered on a Büchner funnel until each of the samples contained approximately 100% of its weight of the sodium hydroxide treating solution. The alkali-wetted samples were then placed in a gas drying tower, the outlet of which was connected to a mercury reservoir, so that a slight gas pressure could be maintained within said tower. The inlet port of the drying tower was connected to a cylinder of commercial carbonyl sulfide gas, and sufficient carbonyl sulfide was flushed through the drying tower to displace any air in the system and maintain an atmosphere of carbonyl sulfide at a slight pressure over the alkali-wetted samples. After about 20 minutes of exposure to the carbonyl sulfide gas, the crude cellulose-O-monothiocarbonate derivatives of the cotton and rayon samples were suspended in sufficient water to completely cover these derivatives, and were then subsequently filtered on a Büchner funnel. The monothiocarbonate derivatives were washed with additional water to remove any remaining water-soluble by-products, and then each of the monothiocarbonated derivatives were suspended for about 30 minutes in separate 300 part aqueous solutions of 1% formaldehyde containing 0.3% sulfuric acid. The resulting esterification reaction mixtures had pH's of approximately 1.6. Upon removal from these aqueous, acidic, formaldehyde solutions, each of the esterified samples were washed with an aqueous solution of 1% formaldehyde which was acidified to a pH of 3.0, and each of the samples were then suspended for four hours at 60° C. in separate polymerization emulsions containing 10 parts of a monomer, 1.0 part of a polyoxyethylene sorbitan trioleate emulsifier ("Tween-85") 3 parts of a 30% solution of hydrogen peroxide, and 540 parts of an aqueous solution of 1% formaldehyde which was acidified to a pH of 3.0 with sulfuric acid. Upon completion of the graft polymerization reactions, the samples were washed and dried in a manner similar to that set forth in the previous examples. The monomers which were employed and the results which were obtained in these graft polymerization reactions were as follows:

A. KNITTED RAYON FABRIC SAMPLES

| Ex. No. | Monomer System | Percent | |
|---|---|---|---|
| | | Conversion of Monomer to Polymer | Polymer in Grafted Form |
| 71 | Ethylacrylate | 25 | 95 |
| 72 | Methylmethacrylate | 63 | 96 |
| 73 | Styrene | 23 | 97 |

B. KNITTED COTTON FABRIC SAMPLES

| Ex. No. | Monomer System | Percent | |
|---|---|---|---|
| | | Conversion of Monomer to Polymer | Polymer in Grafted Form |
| 74 | Ethylacrylate | 8 | 54 |
| 75 | Methylmethacrylate | 39 | 55 |
| 76 | Styrene | 10 | 81 |

EXAMPLES 77–80

Four 10 part samples of unpasted, powder potato starch were sodium dithiocarbonated by suspending each of the samples for fifteen minutes in separate emulsions, each of which contained 1.2 parts of carbon disulfide, 1 part sodium hydroxide, 0.1 part of an emulsifier ("Triton X-155"), and 250 parts of water. After this fifteen-minute period, the dithiocarbonated starch samples were filtered, and then each were suspended for 30 minutes in a solution consisting of 150 parts of aqueous 2% formaldehyde and 11 parts of aqueous 10% sulfuric acid. Upon completion of this esterification, 80 parts of acetone were added and thoroughly mixed into each of the separate slurries of the esterified starch derivatives. The slurries were then filtered and immediately dispersed in separate polymerization emulsions composed of 20 parts of a monomer or a mixture of monomers, 2.5 parts of an emulsifier ("Tween-85"), 3.0 parts of a 30% solution of hydrogen peroxide, and 50 parts of an aqueous solution of 1% formaldehyde which has been adjusted to a pH of 3 with 10% sulfuric acid. The copolymerization reactions were continued for 18 hours at room temperature. The monomers which were employed and the results which were obtained in these graft polymerization reactions were as follows:

| Ex. No. | Monomer System | Percent | |
|---|---|---|---|
| | | Conversion of Monomer to Polymer | Polymer in Grafted Form |
| 77 | Ethylacrylate | 99 | 40 |
| 78 | Methylmerhacrylate | 100 | 91 |
| 79 | 50% Styrene, 50% acrylonitrile | 97 | 72 |
| 80 | 50% Styrene, 50% methylmethacrylate | 96 | 47 |

Although the examples shown above are with unpasted, granular potato starch, such unpasted, granular amylaceous substrates as wheat, corn, rice and tapioca starches, amylose, amylopectin, and chemically modified starches which still contain reactive hydroxyl groups either directly on the anhydroglucose units making up the starch molecules, or on naturally occurring and/or synthetically inserted side chains can also be employed. Generally, all types of materials containing amylaceous substances of from about 2 to 100% may be treated according to the process of this invention.

What is claimed is:

1. A process for preparing graft copolymers of ethylenically unsaturated compounds and a cellulose-containing or a starch-containing material which comprises:
    (a) forming an S-ester of a water-insoluble O-thiocarbonate derivative of cellulose or an S-ester of a water-insoluble O-thiocarbonate derivative of starch by reacting said O-thiocarbonate derivative with an aldehyde or a dialdehyde in an acid medium; and
    (b) reacting said S-ester, in an acid medium and in the presence of an aldehyde or dialdehyde, with at least one ethylenically unsaturated compound, via peroxidic free-radical initiation.

2. A process as claimed in claim 1 wherein the pH during both the formation of the S-ester of the O-thiocarbonate derivative and the subsequent reaction of said S-ester with the ethylenically unsaturated compound is in the range of from about 5.0 to about 0.5.

3. A process as claimed in claim 2 wherein the pH is in the range of from about 4.0 to about 1.0.

4. A process as claimed in claim 3 wherein the aldehyde or dialdehyde is present in a concentration of from about 0.15% by weight to about 5.0% by weight, based on the total weight of the reaction mixture, during both the formation of the S-ester of the O-thiocarbonate derivative and the subsequent reaction of said S-ester with the ethylenically unsaturated compound.

5. A process as claimed in claim 4 wherein the aldehyde or dialdehyde is present in a concentration of from about 0.5% by weight to about 3% by weight, based on the total weight of the reaction mixture.

6. A process as claimed in claim 5 wherein the aldehyde or dialdehyde which is employed during both the formation of the S-ester of the O-thiocarbonate derivative and the subsequent reaction of said S-ester with the ethylenically unsaturated compound is at least one member of the group consisting of formaldehyde, acetaldehyde and glyoxal.

7. A process as claimed in claim 6 wherein the ethylenically unsaturated compound is at least one compound having the formula $R^{IV}HC=CHR^{IV}$, $H_2C=CR_2^{IV}$ or $R_2^{IV}C=CR_2^{IV}$ wherein $R^{IV}$ is selected from the class consisting of (1) hydrogen, (2) alkyl groups, (3) alkenyl groups, (4) alkynyl groups, (5) aryl groups, (6)

alicyclic groups, (7) heterocyclic groups, (8) carbalkoxy groups having the general formula

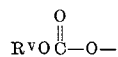

(9) groups having the general formula

(10) groups having the general formula

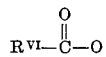

(11) groups having the general formula $R^{VI}$—O—; and
(12) groups having the general formula

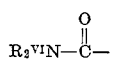

wherein $R^V$ and $R^{VI}$ are selected from the class consisting of hydrogen and hydrocarbon groups containing from 1 to about 18 carbon atoms.

8. A process as claimed in claim 7 wherein the reaction of the S-ester with the ethylenically unsaturated compound is conducted in an aqueous polymerization system in which the monomer is uniformly distributed.

9. A process as claimed in claim 8 wherein the reaction of the S-ester with the ethylenically unsaturated compound is conducted in the presence of at least one member of the group consisting of an emulsifying agent and a wetting agent.

10. A process as claimed in claim 9 wherein the water-insoluble O-thiocarbonate derivative of cellulose or starch which is employed in preparing the S-ester is a dithiocarbonate derivative of cellulose or starch.

11. A process as claimed in claim 9 wherein the water-insoluble O-thiocarbonate derivative of cellulose or starch which is employed in preparing the S-ester is a monothiocarbonate derivative of cellulose or starch.

12. A process as claimed in claim 10 wherein the dithiocarbonate derivative which is employed in preparing the S-ester is a sodium salt of a cellulose-O-dithiocarbonate derivative of rayon, wherein the aldehyde or dialdehyde which is employed during both the formation of the S-ester of the dithiocarbonate derivative and the subsequent reaction of said S-ester with the ethylenically unsaturated compound is formaldehyde, and wherein the peroxidic free-radical initiator which is employed in the reaction of the S-ester with the ethylenically unsaturated compound is hydrogen peroxide.

13. A process as claimed in claim 10 wherein the dithiocarbonate derivative which is employed in preparing the S-ester is a sodium salt of a cellulose-O-dithiocarbonate derivative of cotton, wherein the aldehyde or dialdehyde which is employed during both the formation of the S-ester of the dithiocarbonate derivative and the subsequent reaction of said S-ester with the ethylenically unsaturated compound is formaldehyde, and wherein the peroxidic free-radical initiator which is employed in the reaction of the S-ester with the ethylenically unsaturated compound is hydrogen peroxide.

14. A process as claimed in claim 10 wherein the dithiocarbonate derivative which is employed in preparing the S-ester is a sodium salt of a cellulose-O-dithiocarbonate derivative of wood pulp, wherein the aldehyde or dialdehyde which is employed during both the formation of the S-ester of the dithiocarbonate derivative and the subsequent reaction of said S-ester with the ethylenically unsaturated compound is formaldehyde, and wherein the peroxide free-radical initiator which is employed in the reaction of the S-ester with the ethylenically unsaturated compound is hydrogen peroxide.

15. A process as claimed in claim 10 wherein the dithiocarbonate derivative which is employed in preparing the S-ester is a sodium salt of a cellulose-O-dithiocarbonate derivative of unpasted, powdered potato starch, wherein the aldehyde or dialdehyde which is employed during both the formation of the S-ester of the dithiocarbonate derivative and the subsequent reaction of said S-ester with the ethylenically unsaturated compound is formaldehyde, and wherein the peroxidic free-radical initiator which is employed in the reaction of the S-ester with the ehtylenically unsaturated compound is hydrogen peroxide.

16. A process as claimed in claim 10 wherein the dithiocarbonate derivative which is employed in preparing the S-ester is a sodium salt of a cellulose-O-dithiocarbonate derivative of rayon, wherein the aldehyde or dialdehyde which is employed during both the formation of the S-ester of the dithiocarbonate derivative and the subsequent reaction of said S-ester with the ethylenically unsaturated compound is acetaldehyde, and wherein the peroxidic free-radical initiator which is employed in the reaction of the S-ester with the ethylenically unsaturated compound is hydrogen peroxide.

17. A process as claimed in claim 10 wherein the dithiocarbonate derivative which is employed in preparing the S-ester is a sodium salt of a cellulose-O-dithiocarbonate derivative of rayon, wherein the aldehyde or dialdehyde which is employed during both the formation of the S-ester of the dithiocarbonate derivative and the subsequent reaction of said S-ester with the ethylenically unsaturated compound is glyoxal, and wherein the peroxidic free-radical initiator which is employed in the reaction of the S-ester with the ethylenically unsaturated compound is hydrogen peroxide.

18. A process as claimed in claim 11 wherein the monothiocarbonate derivative which is employed in preparing the S-ester is a sodium salt of a cellulose-O-monothiocarbonate derivative of rayon, wherein the aldehyde or dialdehyde which is employed during both the formation of the S-ester of the monothiocarbonate derivative and the subsequent reaction of said S-ester with the ethylenically unsaturated compound is formaldehyde, and wherein the peroxidic free-radical initiator which is employed in the reaction of the S-ester with the ethylenically unsaturated compound is hydrogen peroxide.

19. A process as claimed in claim 11 wherein the monothiocarbonate derivative which is employed in preparing the S-ester is a sodium salt of a cellulose-O-monothiocarbonate derivative of cotton, wherein the aldehyde or dialdehyde which is employed during both the formation of the S-ester of the monothiocarbonate derivative and the subsequent reaction of said S-ester with the ethylenically unsaturated compound is formaldehyde, and wherein the peroxidic free-radical initiator which is employed in the reaction of the S-ester with the ethylenically unsaturated compound is hydrogen peroxide.

References Cited

UNITED STATES PATENTS

| | | | |
|---|---|---|---|
| 2,922,768 | 1/1960 | Mino et al. | 260—17.4 XR |
| 3,357,933 | 12/1967 | Faessinger et al. | 260—17.4 XR |
| 3,359,224 | 12/1967 | Faessinger et al. | 260—17.4 XR |

OTHER REFERENCES

Schildknecht "Polymer Processes," Interscience (1956), p. 27.

WILLIAM H. SHORT, Primary Examiner

E. NIELSEN, Assistant Examiner

U.S. Cl. X.R.

8—116; 260—17, 216, 233.5